(12) United States Patent
Okamoto et al.

(10) Patent No.: US 11,049,373 B2
(45) Date of Patent: Jun. 29, 2021

(54) STOREFRONT DEVICE, STOREFRONT MANAGEMENT METHOD, AND PROGRAM

(71) Applicant: NEC CORPORATION, Tokyo (JP)

(72) Inventors: Takahiro Okamoto, Tokyo (JP); Shinya Yamasaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/640,283

(22) PCT Filed: Mar. 12, 2018

(86) PCT No.: PCT/JP2018/009452
§ 371 (c)(1),
(2) Date: Feb. 19, 2020

(87) PCT Pub. No.: WO2019/038965
PCT Pub. Date: Feb. 28, 2019

(65) Prior Publication Data
US 2020/0364997 A1 Nov. 19, 2020

(30) Foreign Application Priority Data

Aug. 25, 2017 (JP) .............................. JP2017-162609

(51) Int. Cl.
*G08B 13/14* (2006.01)
*G06K 9/00* (2006.01)
*G06T 7/20* (2017.01)

(52) U.S. Cl.
CPC ..... *G08B 13/1481* (2013.01); *G06K 9/00268* (2013.01); *G06K 9/00288* (2013.01);
(Continued)

(58) Field of Classification Search
CPC .............. G06Q 30/02; G06Q 30/0201; G06K 9/00778; G06K 9/00335; G06K 9/00771;
(Continued)

(56) References Cited

U.S. PATENT DOCUMENTS 8,219,438 B1 * 7/2012 Moon ................ G06Q 30/0201
705/7.29
9,727,838 B2 * 8/2017 Campbell ............ G06Q 10/087
(Continued)

FOREIGN PATENT DOCUMENTS

JP   11-025337 A   1/1999
JP   2013-077186 A   4/2013
(Continued)

OTHER PUBLICATIONS

International Search Report for PCT/JP2018/009452 filed Jun. 12, 2018 (PCT/ISA/210).

*Primary Examiner* — Mirza F Alam
(74) *Attorney, Agent, or Firm* — Sughrue Mion, PLLC (57) ABSTRACT

First position information indicating positions of approaching people nearing merchandise is acquired. Second position information indicating a position of a subject person who has stretched an arm out towards the merchandise among the approaching people, is detected. A movement action performed on the merchandise is detected. An ID of a person corresponding to the subject person who performed the detected movement action is specified based on a positional relationship between the first position information and the second position information.

9 Claims, 6 Drawing Sheets

(52) U.S. Cl.
CPC ..... *G06K 9/00355* (2013.01); *G06K 9/00375* (2013.01); *G06K 9/00771* (2013.01); *G06T 7/20* (2013.01); *G08B 13/1472* (2013.01); *G06T 2207/30232* (2013.01)

(58) Field of Classification Search
CPC . G06K 9/00295; G06K 9/00362; G06T 7/246
See application file for complete search history.

(56) References Cited

U.S. PATENT DOCUMENTS

| | | | | |
|---|---|---|---|---|
| 2008/0306756 | A1* | 12/2008 | Sorensen | G06Q 30/02 705/27.1 |
| 2008/0319835 | A1* | 12/2008 | Tsuji | G06Q 30/0201 705/7.29 |
| 2020/0019921 | A1* | 1/2020 | Buibas | H04N 5/247 |
| 2020/0265586 | A1* | 8/2020 | Yang | G06K 9/00771 |

FOREIGN PATENT DOCUMENTS

| | | |
|---|---|---|
| JP | 2015-191518 A | 11/2015 |
| WO | 2015/033577 A1 | 3/2015 |
| WO | 2017/085771 A1 | 5/2017 |

* cited by examiner

STOREFRONT DEVICE, STOREFRONT MANAGEMENT METHOD, AND PROGRAM

CROSS REFERENCE TO RELATED APPLICATIONS

This application is a National Stage of International Application No. PCT/JP2018/009452 filed Mar. 12, 2018, claiming priority based on Japanese Patent Application No. 2017-162609, filed Aug. 25, 2017, the disclosure of which is incorporated herein by reference.

TECHNICAL FIELD

The present invention relates to a storefront device, a storefront management method, and a program.

BACKGROUND ART

Technology is sought for managing automatic payments for merchandise that a customer wishes to purchase in a storefront. Patent Document 1 discloses, as related art, technology relating to an unmanned storefront.

CITATION LIST

Patent Literature

Patent Document 1

Japanese Unexamined Patent Application, First Publication No. 11-25337

SUMMARY OF INVENTION

Problem to be Solved by the Invention

In information processing devices that are installed in storefronts or the like, it is necessary to improve the merchandise recognition precision of merchandise that has been taken in the hand of a customer or that has been returned to a merchandise shelf.

Thus, an objective of the present invention is to provide a storefront device, a storefront management method and a program that can solve the above-mentioned problem.

Means for Solving the Problem

According to a first embodiment of the present invention, a storefront device includes: a first position information acquisition unit configured to acquire first position information indicating positions of approaching people who are nearing merchandise; a second position information acquisition unit configured to detect second position information indicating a position of a subject person who has stretched an arm out towards the merchandise among the approaching people; an action detection unit configured to detect a movement action performed on the merchandise; and a person specifying unit configured to specify, based on a positional relationship between the first position information and the second position information, identification information corresponding to the subject person who performed the detected movement action.

According to a second embodiment of the present invention, a storefront management method includes: acquiring first position information indicating positions of approaching people nearing merchandise; detecting second position information indicating a position of a subject person who has stretched an arm out towards the merchandise among the approaching people; detecting a movement action performed on the merchandise; and specifying, based on a positional relationship between the first position information and the second position information, identification information corresponding to the subject person who performed the detected movement action.

According to a third embodiment of the present invention, a program causes a computer of a storefront device to execute processes. The processes includes: acquiring first position information indicating positions of approaching people nearing merchandise; detecting second position information indicating a position of a subject person who has stretched an arm out towards the merchandise among the approaching people; detecting a movement action performed on the merchandise; and specifying, based on a positional relationship between the first position information and the second position information, identification information corresponding to the subject person who performed the detected movement action.

Advantageous Effects of Invention

According to the present invention, it is possible to improve the merchandise recognition precision of merchandise that has been taken in the hand of a person in a storefront or that has been returned to a merchandise shelf.

DESCRIPTION OF EMBODIMENTS

Hereinafter, a storefront device according to an embodiment of the present invention will be explained with reference to the drawings.

Figure 1:
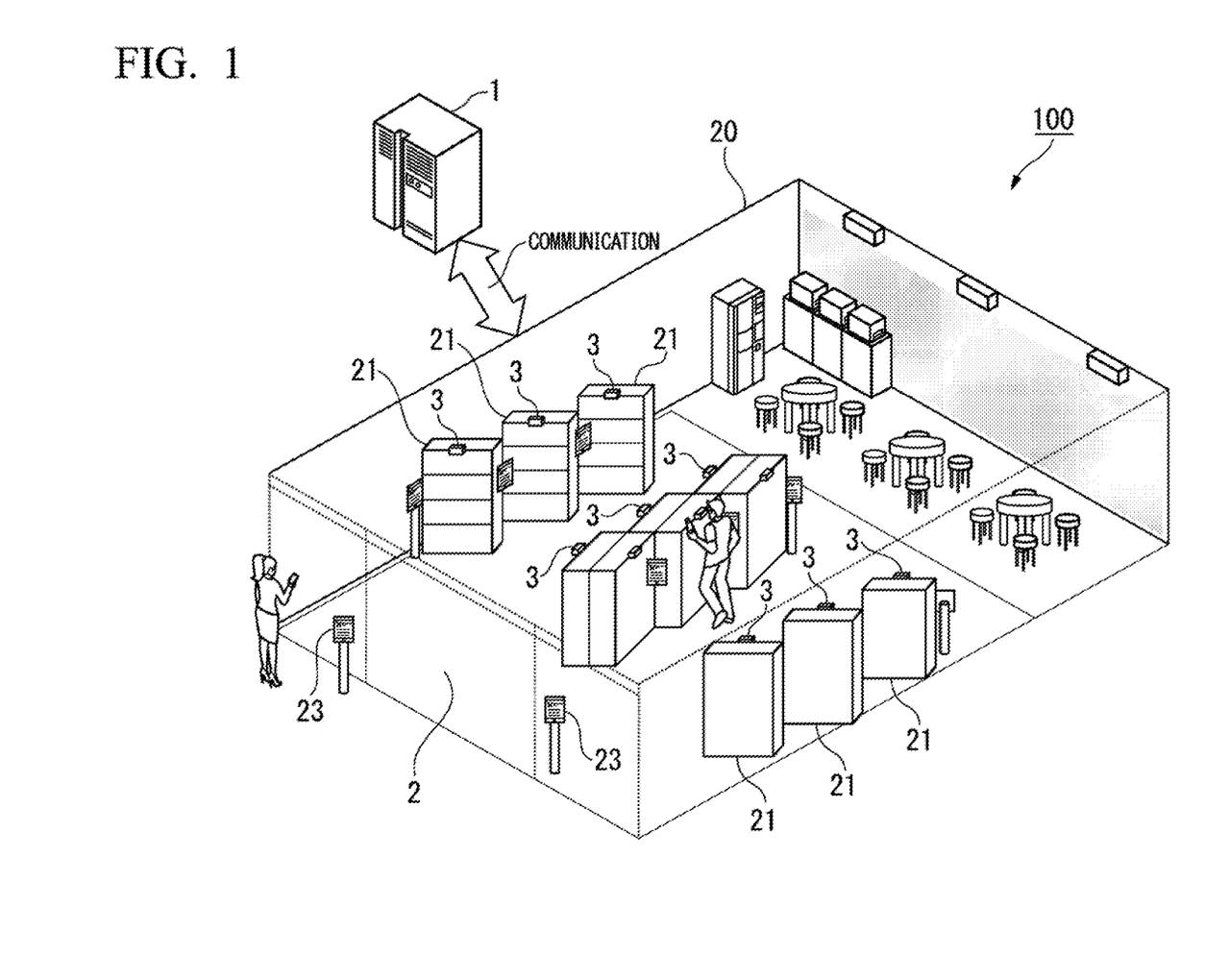
FIG. 1 is a schematic diagram of a storefront system according to an embodiment of the present invention.

FIG. 1 is a schematic diagram of a storefront system provided with the storefront device according to the present embodiment.

As illustrated in this drawing, the storefront device 1 is communicably connected to devices provided in a storefront 20. The storefront 20 is provided, for example, with an entrance/exit gate 2. A plurality of merchandise shelves 21 are provided in the storefront 20. Merchandise is arranged on each merchandise shelf 21.

The storefront 20 that is managed by the storefront system 100 according to the present embodiment has a structure in which a user enters or exits the store by passing through an entrance/exit gate 2. It is not necessary for an employee to always be stationed at the storefront 20. It is also possible for an employee to always be stationed at the storefront 20. A user takes merchandise from merchandise shelves 21 in the hand, and exits the store through the entrance/exit gate 2. Until the user exits the store through the entrance/exit gate 2, sensing devices such as image capture devices and motion sensors provided in the store acquire and transmit, to the storefront device 1, sensing information for determining feature information and position information of the user, and identification information and the positions of the merchandise acquired by the user, or the like. The storefront device 1 uses the received sensing information to automatically perform a payment process.

Figure 2:
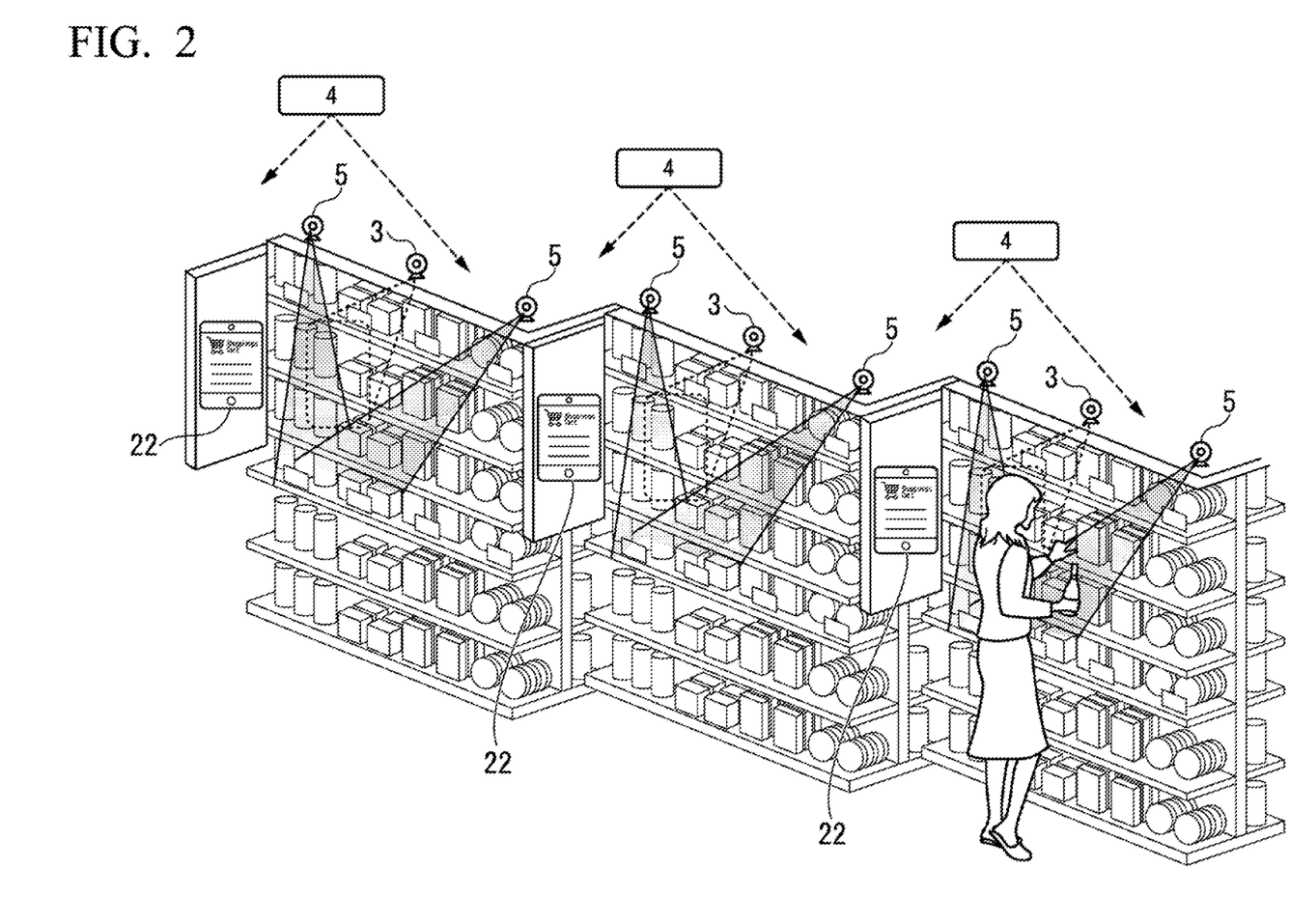
FIG. 2 is a diagram illustrating merchandise shelves and a user acquiring merchandise from a merchandise shelf according to an embodiment of the present invention.

FIG. 2 is a diagram illustrating merchandise shelves and a user acquiring merchandise from a merchandise shelf.

A plurality of first cameras 3 may be provided on each merchandise shelf 21. Additionally, a motion sensor 4 for sensing the motion of the user is provided above the merchandise shelf 21. Additionally, second cameras 5 for capturing images of merchandise taken in the hand of a user of the storefront 20 and merchandise returned to the merchandise shelf 21 are provided above the merchandise shelf 21. The first cameras 3 and the second cameras 5 do not need to be provided on the merchandise shelves 21. The first cameras 3 and the second cameras 5 may be provided anywhere, such as in the ceiling or in the floor, as long as they are positions from which it is possible to capture facial images, images of merchandise taken in the hand of a user, and images of merchandise returned to the merchandise shelves 21.

Figure 3:
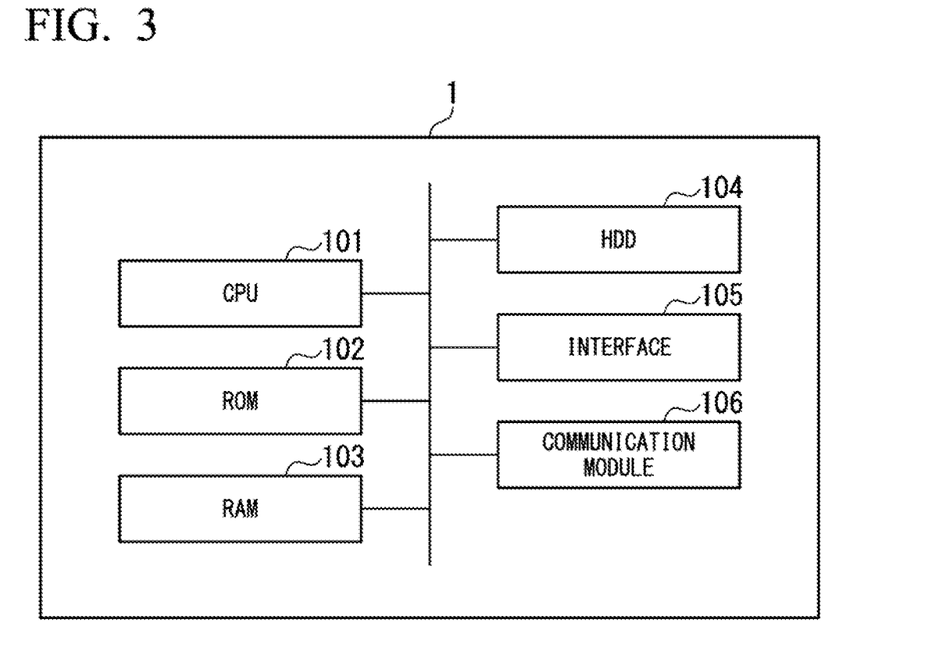
FIG. 3 is a hardware configuration diagram for a storefront device according to an embodiment of the present invention.

FIG. 3 is a hardware configuration diagram for a storefront device.

As illustrated in FIG. 3, the storefront device 1 is provided, as an example, with hardware features including a CPU (Central Processing Unit) 101, a ROM (Read Only Memory) 102, a RAM (Random Access Memory) 103, an HDD (Hard Disk Drive) 104, an interface 105 and a communication module 106. The HDD 104 may be an SSD (Solid State Drive).

Figure 4:
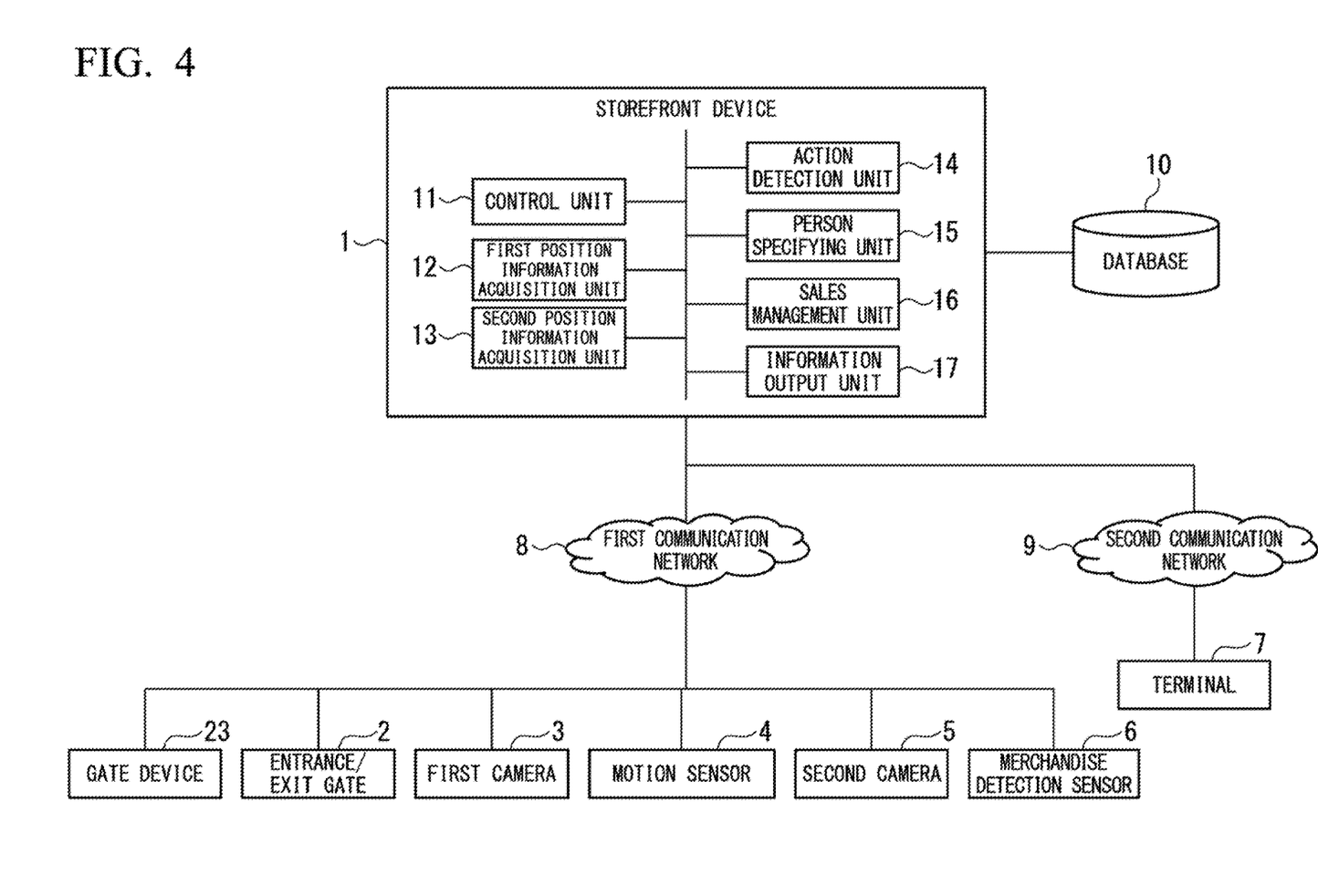
FIG. 4 is a functional block diagram of a storefront device according to an embodiment of the present invention.

FIG. 4 is a functional block diagram of a storefront device.

The CPU 101 of the storefront device 1 reads and executes a storefront management program that is pre-recorded in a storage unit. As a result thereof, the storefront device 1 is provided with the functions of a control unit 11, a first position information acquisition unit 12, a second position information acquisition unit 13, an action detection unit 14, a person specifying unit 15, a sales management unit 16 and an information output unit 17.

As illustrated in FIG. 4, the storefront device 1 is connected to a database 10. The storefront device 1 is communicably connected, via a first communication network 8, to the devices provided inside the storefront 20, such as the entrance/exit gate 2, the first cameras 3, the motion sensors 4, the second cameras 5, merchandise detection sensors 6, and gate devices 23. The first communication network 8 is, for example, a dedicated communication network for connecting the storefront device 1 with the devices in the storefront 20. The storefront device 1 is also connected, via a second communication network 9, with a terminal 7 carried by the user of the storefront 20. The second communication network 9 is a mobile telephone network or the internet.

Due to the above-mentioned functions of the storefront device 1 according to the present embodiment, the storefront device 1 acquires first position information indicating the positions of biological feature information of approaching people who are nearing merchandise, based on images obtained from the first cameras 3. The first cameras 3 are cameras that are used to detect biological feature information of people appearing within an image capture range, and as an example, are installed on the merchandise shelves 21. The first cameras 3 capture images of the faces of people positioned in front of the merchandise shelves 21. The biological feature information may, for example, be feature information relating to the face, or feature information relating the irises in the eyes. The approaching people may be store users, such as customers, or may be a manager who manages the storefront 20.

Additionally, the storefront device 1 detects second position information indicating the position of a subject person who has reached out for merchandise among the approaching people, based on sensing information obtained from the motion sensors 4. The motion sensors 4 are installed, for example, in the ceiling above the positions of the merchandise shelves 21, and sense a subject person below from the ceiling. Furthermore, the storefront device 1 detects merchandise movement actions. For example, the storefront device 1 detects merchandise movement actions based on images from second cameras 5 that are installed so as to correspond to the respective merchandise shelves 21 and that capture images of the merchandise arranged on those merchandise shelves 21, and information obtained from the merchandise detection sensors 6. Merchandise movement actions are actions for taking merchandise in the hand, actions for returning merchandise to the merchandise shelves 21, or the like. The storefront device 1 specifies the biological feature information for a subject person who has performed a merchandise movement action based on an ID and the position of the merchandise on which the movement action was performed, and the positional relationship between the first position information and the second position information. The storefront device 1 acquires the ID of a person corresponding to that feature information. Then, the storefront device 1 manages sales management information or the like corresponding to the ID of the specified subject person, such as by assigning identification information for the merchandise on which the movement action was performed.

The process for detecting merchandise movement actions in the storefront device 1 will be explained.

When a user of the storefront 20 passes through the entrance/exit gate 2, code information such as a two-dimensional code image displayed on a terminal 7 is shown to a gate device 23 provided on the entrance/exit gate 2. As a result thereof, the entrance/exit gate 2 reads the two-dimensional code image and outputs, to the storefront device 1, an ID for a store user or the like indicated by the two-dimensional code. The entrance/exit gate 2 may read the ID of the store user or the like from the terminal 7 by means of wireless communication. The storefront device 1 generates sales management information or the like linked to the ID of a person such as a store user. At this time, merchandise information is not linked to the sales management information. Then, a first camera 3 captures, from a merchandise shelf 21, images of a person such as a store user positioned in front of the merchandise shelf 21, and outputs the captured images or video images to the storefront device 1. A motion sensor 4 senses a store user below from above the merchandise shelf 21, such as from the ceiling, and outputs information obtained by the sensing process to the storefront device 1.

The information sensed and output by the motion sensor 4 may, for example, be a range image or the like obtained by converting, to an image, the ranges to the positions of objects, obtained by means of infrared rays.

A merchandise detection sensor 6 is installed, for example, for each item of merchandise displayed on a merchandise shelf 21. The merchandise detection sensors 6 may specifically be in the shapes of sheets that are laid underneath the merchandise, and may be pressure sensors for detecting pressure due to the weight of the merchandise at each position set on the sheet, or may be weight sensors for detecting the weight itself. When, for example, a user takes merchandise in his/her hand, a merchandise detection sensor 6 outputs, to the storefront device 1, a merchandise acquisition signal including a sensor ID of that merchandise detection sensor 6 and coordinates in the storefront of that merchandise on the merchandise shelf 21. The storefront device 1 specifies a personal ID on the basis of the correspondence between the times at which coordinates indicated by feature information and skeletal frame information of people obtained by the first cameras 3, the motion sensors 4 and the second cameras 5 were detected, and merchandise IDs, coordinates and times stored so as to be linked to the sensor IDs of the merchandise detection sensors 6, received from the merchandise detection sensors 6.

The storefront device 1 links the specified personal ID to the merchandise ID specified by images taken by a second camera 5, and updates the sales management information and the like recorded in a data table in the database 10.

When the merchandise is returned to a merchandise shelf 21, the merchandise detection sensor 6 outputs, to the storefront device 1, merchandise return action information including the sensor ID of that merchandise detection sensor 6 and position information, such as the coordinates in the storefront of that merchandise on the merchandise shelf 21. The storefront device 1 performs a process for unlinking the store user identification information (ID) and the merchandise ID recorded in the database 10. Specifically, the storefront device 1 performs a process for unlinking the store user identification information (ID) and the merchandise ID on the basis of the merchandise ID and the position information stored so as to be linked to the sensor ID of the merchandise detection sensor 6 indicated by that merchandise return action information, and the feature information and skeletal frame information of that person.

The storefront device 1 may detect the identification information for merchandise taken in the hand by the user or the coordinates in the storefront of that merchandise on the merchandise shelf 21 on the basis of images obtained from the second cameras 5 instead of the information obtained from the merchandise detection sensors 6. Additionally, the storefront device 1 may detect the identification information of merchandise returned to a merchandise shelf 21 and the coordinates in the storefront of that merchandise on the merchandise shelf 21 based on images obtained from the second cameras 5. In other words, the storefront device 1 only needs to detect merchandise movement actions based on either the merchandise detection sensors 6 or the images obtained from the second cameras 5. A movement action refers to an action by a user to take merchandise from a merchandise shelf 21, or an action to return the merchandise to the merchandise shelf 21.

Due to such processes, the storefront device 1 is able to store information regarding which merchandise the user has taken in the hand and which merchandise has been returned to the merchandise shelf 21. Additionally, when passing through the entrance/exit gate 2 to exit the store, the user shows a two-dimensional code image displayed on the terminal 7 to a gate device 23 provided on the entrance/exit gate 2. As a result thereof, the entrance/exit gate 2 reads the two-dimensional code image and outputs, to the storefront device 1, store-exit information including the ID of the store user indicated by said two-dimensional code. The storefront device 1 can automatically detect the merchandise to be purchased by the user on the basis of the relationship between the merchandise ID and the ID of that user recorded as sales management information in the database 10 when the user exits the store through the entrance/exit gate 2. The storefront device 1 is able to automatically perform a payment process using the ID of the user recorded in the database 10, the merchandise ID, and a credit card number or the like to be used by the user for payment. The above-mentioned processes of the respective devices in the storefront 20 and the above-mentioned processes of the storefront device 1 performed from when the user enters the storefront 20 until the user leaves are merely one example. The processes for detecting merchandise purchased by the user may be performed on the basis of other processes.

As mentioned above, the storefront device 1 detects actions in which a store user takes merchandise from a merchandise shelf 21 and actions in which the store user returns the merchandise to a merchandise shelf 21. However, there is a need to raise the recognition precision for recognizing which person acquired which merchandise. For example, when there are multiple people positioned in front of a merchandise shelf 21 and one of those people has taken a specific item of merchandise in the hand, the storefront device 1 cannot automatically proceed with a merchandise purchase process unless it is recognized, with high precision, which person has taken which item of merchandise. Hereinafter, technology for raising the recognition precision for recognizing which person took which item of merchandise will be explained. The storefront device 1 may also determine which items of merchandise have been acquired by people, such as employees, other than people visiting the store for the purpose of purchasing merchandise.

Figure 5:
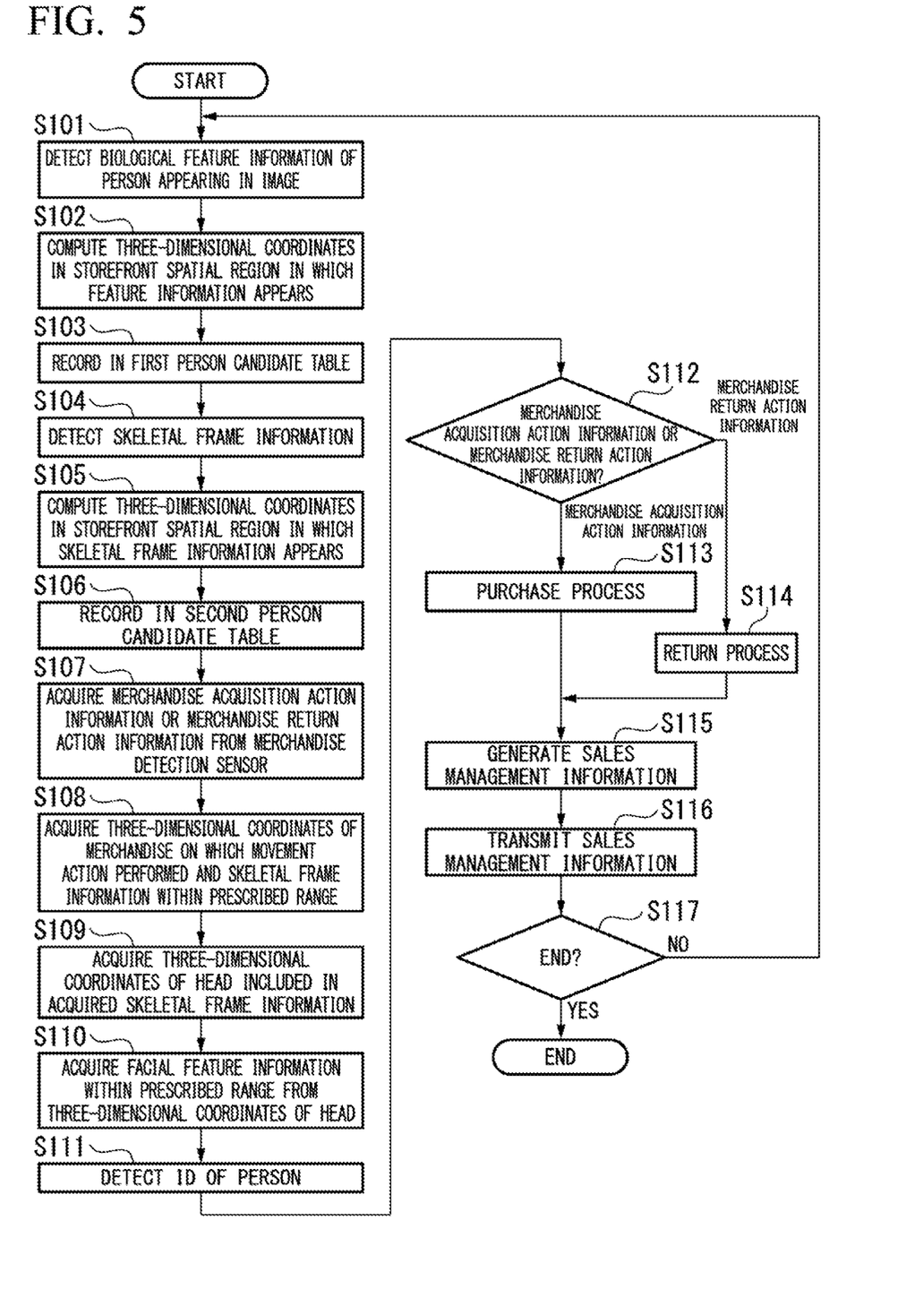
FIG. 5 is a diagram illustrating the processing flow in a storefront device according to an embodiment of the present invention.

FIG. 5 is a diagram illustrating the processing flow in a storefront device.

The first position information acquisition unit 12 in the storefront device 1, as an example, acquires several to several tens of images per second from each of a plurality of first cameras 3. The plurality of first cameras 3 are installed in the respective merchandise shelves 21 so as to be able to capture images of people positioned in from of the shelves. The first position information acquisition unit 12 detects biological feature information for the people appearing in the acquired images (step S101). The biological feature information may, for example, be feature information relating to the face, or feature information relating to the irises in the eyes. The first position information acquisition unit 12, upon successfully acquiring biological feature information from the images, computes the spatial coordinates at which the feature information was successfully detected. For example, suppose that, for the first position information acquisition unit 12, three-dimensional image capture spatial regions are predetermined based on angles of view and shooting directions.

The first position information acquisition unit 12 acquires, from the database 10, a three-dimensional image capture spatial region for each first camera 3. The first position information acquisition unit 12 computes the three-dimensional coordinates, within a three-dimensional image capture spatial region, at which feature information appears, by means of a prescribed computational expression, on the basis of the acquired three-dimensional image capture spatial region, the coordinates within the image of the feature information appearing in the image, the size of the feature information, and the like. Additionally, the first position information acquisition unit 12 uses a conversion expression, for converting coordinates in the three-dimensional image capture spatial region to coordinates indicating storefront spatial regions, to compute the three-dimensional coordinates, within a storefront spatial region, at which the feature information appears (step S102).

When biological feature information has been acquired from an image, the first position information acquisition unit 12 records, in a first person candidate table, in an associated manner, the ID of the first camera 3 that transmitted the image, the detection time, the biological feature information, and the three-dimensional coordinates, within a storefront spatial region, at which the feature information appeared (step S103).

The second position information acquisition unit 13, as an example, acquires several to several tens of range images per second from a plurality of motion sensors 4. The plurality of motion sensors 4 are provided in the ceiling or the like above the merchandise shelves 21, and are installed so as to be able to capture images, facing downwards from above, of people positioned in front of the shelves. The second position information acquisition unit 13 analyzes the range images of people appearing in the acquired images, and detects skeletal frame information, such as the positions of heads and the axes of arms stretched out by people in the images (step S104). The skeletal frame information may include vectors and coordinates indicating straight lines representing arm axes, and the coordinates of the tips of hands obtained by analysis of the range images. The skeletal frame information includes at least coordinates or vectors, or expressions representing the axes of arms for specifying the positions, within coordinates, of the head, arms or tips of the hands viewed from above.

When skeletal frame information including an arm axis and a hand tip are acquired from an image, the second position information acquisition unit 13 computes the spatial coordinates of the arm or the hand tip indicating the skeletal frame information. As with the first position information acquisition unit 12, the second position information acquisition unit 13 pre-stores three-dimensional image capture spatial regions based on angles of view and shooting directions. The second position information acquisition unit 13 acquires, from the database 10, a three-dimensional image capture spatial region for each motion sensor 4. The second position information acquisition unit 13 computes, by means of a prescribed computational expression, the three-dimensional coordinates, within a three-dimensional image capture spatial region, at which skeletal frame information appears, based on the acquired three-dimensional image capture spatial region, the coordinates within the image of the skeletal frame information appearing in the image, the range from the motion sensor 4, and the like. Additionally, the second position information acquisition unit 13 uses a conversion expression for converting coordinates in the three-dimensional image capture spatial region to coordinates indicating storefront spatial regions to compute the three-dimensional coordinates, within a storefront spatial region, at which the skeletal frame information appears (step S105).

When skeletal frame information has been successfully acquired from an image, the second position information acquisition unit 13 records, in a second person candidate table, in an associated manner, the ID of the motion sensor 4 that transmitted the image, the detection time, the skeletal frame information, and the three-dimensional coordinates, within a storefront spatial region, at which the skeletal frame information appeared (step S106).

The merchandise detection sensor 6, as one example, detects the weight of merchandise or pressure due to said weight. Based on increases, decreases and the like in the weight or pressure, if there is a weight or pressure decrease of a threshold value or more, then the merchandise detection sensor 6 outputs, to the storefront device 1, merchandise acquisition action information including a flag indicating a decrease, a sensor ID, a merchandise arrangement position (third position information) and an action detection time. Additionally, based on the weight or pressure increases, decreases and the like, if there is a weight or pressure increase of a threshold value or more, then the merchandise detection sensor 6 outputs, to the storefront device 1, merchandise return action information including a flag indicating an increase, a sensor ID, a merchandise arrangement position (third position information) and an action detection time.

The action detection unit 14 in the storefront device 1 acquires merchandise acquisition action information and merchandise return action information from the merchandise detection sensor 6 (step S107). The action detection unit 14, based on merchandise acquisition action information, acquires a merchandise ID stored so as to be linked to the sensor ID included in the merchandise acquisition action information. As a result thereof, the action detection unit 14 detects that the merchandise having that merchandise ID has been acquired from a merchandise shelf 21. Additionally, the action detection unit 14, based on merchandise return action information, acquires a merchandise ID stored so as to be linked to the sensor ID included in the merchandise acquisition action information. As a result thereof, the action detection unit 14 detects that the merchandise having that merchandise ID has been returned to the merchandise shelf 21. The action detection unit 14 outputs, to the person specifying unit 15, the merchandise ID, the arrangement position and the action detection time corresponding to the sensor ID included in the merchandise acquisition action information or the merchandise return action information.

Upon acquiring, from the action detection unit 14, the merchandise ID, the arrangement position and the action detection time for the movement action, the person specifying unit 15 performs the determination process described next. In other words, the person specifying unit 15 determines whether or not the second person candidate table has, recorded therein, skeletal frame information that includes coordinates that are close, to within a prescribed range, to the three-dimensional coordinates in the storefront spatial region indicated by the arrangement position, and that is linked to a detection time within a predetermined time difference relative to the action detection time. When there is, recorded in the second person candidate table, skeletal frame information that includes coordinates close, to within a prescribed range, to the three-dimensional coordinates of the merchandise on which the movement action was performed, and that is linked to a detection time within a predetermined time difference relative to the action detection time, the person specifying unit 15 acquires that skeletal frame information (step S108).

For example, the skeletal frame information includes the three-dimensional coordinates of the tip of a hand. When the three-dimensional coordinates of an item of merchandise and the three-dimensional coordinates of the tip of the hand approach close to each other at roughly the same time, the person specifying unit 15 infers that the skeletal frame information including the three-dimensional coordinates of that hand tip is skeletal frame information of the person that took the item of merchandise in the hand, and acquires that skeletal frame information. Therefore, based on the three-dimensional coordinates of an item of merchandise on which a movement action has been performed, the person specifying unit 15 acquires the three-dimensional coordinates of a head included in the skeletal frame information acquired as mentioned above, and the detection time of that skeletal frame information (step S109).

The person specifying unit 15 acquires, from the first person candidate table, facial feature information that is linked to three-dimensional coordinates within a prescribed range from the three-dimensional coordinates of the head, and that has a detection time within a prescribed time difference (step S110). The processes in this person specifying unit 15 are one mode of the processes for specifying the position (second position information) indicated by skeletal frame information of a subject person who has stretched out an arm towards an item of merchandise based on an acquired merchandise position (third position information), and for detecting the position (first position information) at which facial feature information having a positional relationship that is significant based on the position indicated by the skeletal frame information. Facial feature information having a significant positional relationship refers to facial feature information that is, for example, highly associated with or correlated to the position indicated by the skeletal frame information. It is assumed that the storefront device 1 pre-stores, in a personal feature table in the database 10, facial feature information linked to personal IDs. Based on that stored information, the person specifying unit 15 uses the facial feature information acquired from the skeletal frame information to detect a personal ID (step S111).

According to the above-mentioned processes, the storefront device 1 detects positions based on the motions of the arms or hands of people that have acquired merchandise from merchandise shelves 21 and the positions of merchandise on which movement actions have been performed. The storefront device 1 determines which merchandise has been acquired by which person, and which merchandise has been returned by which person based on the correspondence relationship between the positions based on the motions of the arms or hands of the people and the positions of the merchandise. Due to such processes, it is possible to determine, more precisely than in the conventional art, which merchandise has been acquired by which person, and which merchandise has been returned by which person.

During the processing for acquiring the merchandise acquisition action information and the merchandise return action information indicated by step S107 above, the storefront device 1 may determine, based on images obtained from the second cameras 5, which type of movement action, whether a merchandise acquisition action or a merchandise return action, has been performed. For example, the action detection unit 14 acquires, as one example, about several to several tens of images per second from each of the second cameras 5. The second cameras 5 have angles of view matched with the ranges of the respective merchandise shelves 21, and capture images of merchandise placed on said shelves.

Based on image data of each item of merchandise placed on the merchandise shelves 21, the action detection unit 14 sequentially detects, by pattern matching or the like, or by movement analysis, the before/after movement amounts and presence/absence of merchandise for each of the items of merchandise appearing in the images, and specifies the items of merchandise that have moved. Additionally, for example, when merchandise that was arranged on a merchandise shelf 21 is gone in images that have been received before and after, it is determined that the merchandise has been acquired. On the other hand, when there is merchandise that was not present arranged on a merchandise shelf 21 in images that have been received before and after, it is determined that the merchandise has been returned to the merchandise shelf 21.

Furthermore, upon determining that merchandise has been acquired, the action detection unit 14 generates merchandise acquisition action information including the ID of that merchandise and the arrangement position of the merchandise. The merchandise ID may be an ID that is recorded so as to be linked to the image data of the merchandise in a database 10 or the like. Additionally, the merchandise arrangement position may be the three-dimensional coordinates in a storefront spatial region computed based on the coordinates in an image captured by a second camera 5. Upon determining that merchandise has been returned to a merchandise shelf 21, the action detection unit 14 generates merchandise return action information including the ID of that merchandise and the arrangement position of the merchandise. The action detection unit 14 outputs, to the person specifying unit 15, the merchandise ID or arrangement position included in the merchandise acquisition action information or the merchandise return action information. The subsequent processing by the person specifying unit 15 may be a process similar to the above-mentioned person specifying process performed by using the coordinates of merchandise on which the movement actions obtained from the merchandise detection sensors 6 have been performed.

As illustrated in FIG. 2, a plurality of second cameras 5 for capturing images of merchandise may be installed on the merchandise shelves 21, and the action detection unit 14 may determine the merchandise on which movement actions have been performed based on images captured by each of the second cameras 5. The second cameras 5 may be installed not only on the merchandise shelves 21, but also in the ceiling or in the floor. The merchandise recognition precision can be raised by capturing images of merchandise on which movement actions have been performed from separate directions by a plurality of the second cameras 5, and analyzing multiple images. In this case, the action detection unit 14 sequentially acquires, from a plurality of second cameras 5, respective images capturing, from different directions, merchandise on which a movement action has been performed. The action detection unit 14 detects the merchandise in the images acquired by the plurality of second cameras 5 by pattern matching. Additionally, the action detection unit 14 determines the three-dimensional coordinates of that merchandise by computing the three-dimensional coordinates of the merchandise appearing in the images by substituting information such as the shooting direction, the angle of view and the size of the merchandise into a computational expression. When the same merchandise appearing in images acquired by each of a plurality of second cameras 5 capturing images of the same merchandise shelf 21 is detected at the same time, the action detection unit 14 recognizes that these are a single item of merchandise. Furthermore, the action detection unit 14 recognizes a movement action of the single item of merchandise based on the multiple images. The database 10 records feature information and image information for the cases in which each item of merchandise is viewed from multiple different angles. The action detection unit 14 uses such merchandise feature information and image information recorded in the database 10 to recognize merchandise appearing in images newly captured by the second cameras 5.

Upon detecting the ID of the person who performed the merchandise movement action in step S111, the person specifying unit 15 outputs sales management information to the sales management unit 16. The sales management information includes merchandise acquisition action information or merchandise return action information, which is information indicating the ID of that person and the movement action. From the sales management information, the sales management unit 16 acquires a personal ID and merchandise acquisition action information or merchandise return action information. The sales management unit 16 determines whether merchandise acquisition action information or merchandise return action information has been acquired (step S112). When the sales management information includes merchandise acquisition action information, the sales management unit 16 performs a purchase process (step S113). In other words, the sales management unit 16 adds one merchandise ID, which is included in the merchandise acquisition action information, to merchandise information recorded in a sales management table in the database 10 so as to be linked to the personal ID. In this way, it is recorded in the database 10 that the person indicated by the personal ID has purchased the merchandise.

On the other hand, when the sales management information includes merchandise return action information, the sales management unit 16 performs a return process (step S114). In other words, the sales management unit 16 performs a return process that involves deleting one merchandise ID, which is included in the merchandise return action information, from the merchandise information recorded in the sales management table in the database 10 linked to the personal ID. In this way, it is recorded in the database 10 that the person indicated by the personal ID has removed the merchandise from the items to be purchased.

The sales management unit 16 outputs, to the information output unit 17, the personal ID and a sales management information change notification indicating that the sales management table has been updated. Upon receiving the sales management information change notification, the information output unit 17, on the basis of that notification, acquires the terminal ID of a terminal 7 recorded in the person management table, in the database 10, linked to that personal ID. Based on the terminal ID, the information output unit 17 generates sales management information to be transmitted to the terminal 7 (step S115). The sales management information, as one example, may be information including a personal ID, a list of the names, IDs and the like, the number of each item of merchandise, the unit price of each item of merchandise, of merchandise taken in the hand by the person specified by that personal ID and determined as being merchandise to be purchased, and the total monetary amount for all merchandise determined as being merchandise to be purchased.

The information output unit 17 transmits the generated sales management information to the terminal 7 on the basis of the terminal ID (step S116). The terminal ID may be a network address of the terminal 7, an ID assigned to a dedicated application program stored in the terminal 7, or the like. The terminal 7 receives the sales management information and outputs it to a screen. As a result thereof, sales management information is displayed on the terminal 7 held by the person detected in step S111, and that person is able to see a list of merchandise that is to be purchased by that person in the storefront and the total monetary amount thereof.

The control unit 11 in the storefront device 1 determines whether or not the process is to be ended (step S117). When the process is not to be ended (NO in step S117), the control unit 11 repeats the process from step S101. The processing units in the storefront device 1 perform the above-mentioned processes in parallel for each person, based on information obtained from the sensors provided in the storefront.

In the above-mentioned processes, the sales management unit 16 in the storefront device 1 performs a process for assigning, to sales management information corresponding to the ID of a person specified by the person specifying unit 15, the IDs of merchandise on which movement actions have been performed by that person. However, instead of storing sales management information indicating that the merchandise is to be purchased, the sales management unit 16 may record the merchandise ID information in another data table as merchandise value management information indicating that the person has expressed an interest in that merchandise.

Additionally, in the above-mentioned processes, the sales management unit 16 in the storefront device 1 performs a process for assigning, to sales management information corresponding to the ID of a person specified by the person specifying unit 15, the IDs of merchandise on which movement actions for return to merchandise shelves 21 have been performed by that person. However, instead of storing sales management information indicating that the merchandise has been returned, the sales management unit 16 may record the merchandise ID information in another data table as merchandise value management information indicating that the person has expressed an interest in, but did not go so far as to purchase, that merchandise.

In the above-mentioned processes in the storefront device 1, a person is specified and merchandise on which a movement action has been performed is specified when just one person is positioned in front of a merchandise shelf 21 and that person acquires the merchandise or returns the merchandise to the merchandise shelf 21. However, even when there are multiple people in front of the merchandise shelf 21, a similar process may be used to determine which of the people performed movement actions on which of the merchandise. In this case, the second position information acquisition unit 13 must detect, using range images acquired from each of the motion sensors 4, the skeletal frame information of the people appearing in each range image in a precise manner for each person. The second position information acquisition unit 13 performs the skeletal frame information detection process for each person based on the number of people appearing in a range image such that, the more people appear in a range image, the heavier the processing load in the second position information acquisition unit 13. However, when there is a large processing capacity for a short time in the processing device 1, the skeletal frame information of people appearing in the range image can be detected in a short time. By setting the processing capacity for a short time to be large in the storefront device 1, the detection of feature information for people and the detection of merchandise movement actions can be performed in a short time.

In the above-mentioned processes, it is also possible to acquire image data for promotional video images based on the personal ID and the merchandise ID included in sales management information. Based on a personal ID and a merchandise ID included in sales management information, an information output unit 17 specifies, from among a plurality of promotional video images recorded in the database 10, one or a plurality of promotional video images regarding that merchandise or merchandise related to that merchandise. Furthermore, the information output unit 17 acquires image data for the one or the plurality of promotional vides images that have been specified.

The information output unit 17 may implement control to output this image data to the terminal 7 having the terminal ID specified by the personal ID, or to a monitor installed in the storefront 20, on a merchandise shelf 21 near the position of the person indicated by the personal ID.

Figure 6:
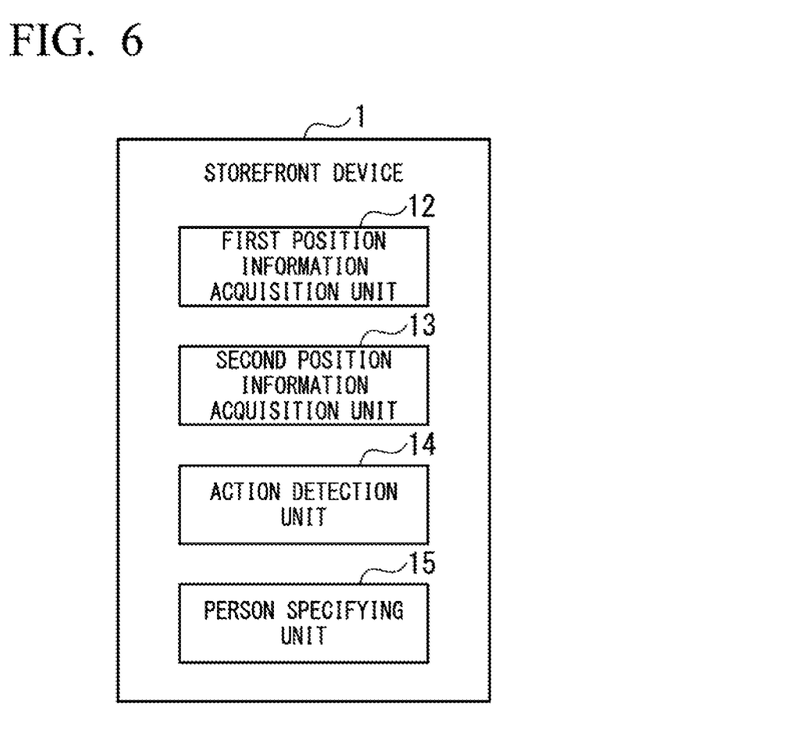
FIG. 6 is a diagram illustrating the minimum configuration for a storefront device according to an embodiment of the present invention.

FIG. 6 is a diagram illustrating the minimum configuration of the storefront device.

The storefront device 1 only needs to be provided with at least the functions of the first position information acquisition unit 12, the second position information acquisition unit 13, the action detection unit 14 and the person specifying unit 15.

The first position information acquisition unit 12 is a processing unit for acquiring first position information indicating the positions of biological feature information of approaching people who are nearing merchandise.

The second position information acquisition unit 13 is a processing unit for detecting second position information indicating the position of a subject person who has stretched out an arm towards merchandise among the approaching people.

The action detection unit 14 is a processing unit for detecting a movement action performed on merchandise.

The person specifying unit 15 is a processing unit for specifying, based on the positional relationship between the first position information and the second position information, identification information corresponding to the biological feature information of a subject person who has performed a detected movement action.

Each of the above-mentioned devices has a computer system in the interior thereof. Additionally, the steps in each of the above-mentioned processes may be stored, in the form of programs, in computer-readable recording media, and these programs may be read into and executed by a computer to perform the above-mentioned processes. In this case, computer-readable recording media refer to magnetic disks, magneto-optic disks, CD-ROMs, DVD-ROMs, semiconductor memory devices and the like. Additionally, these computer programs may be distributed to computers by means of communication lines, and the programs may be executed by the computers receiving the distributed programs.

Additionally, the above-mentioned programs may be for realizing some of the aforementioned functions.

Furthermore, the aforementioned functions may be implemented by so-called difference files (difference programs) that can be realized by being combined with programs that are already recorded on a computer system.

Some or all of the above-mentioned embodiments could be described as in the following supplementary notes, but they are not limited to the following supplementary notes.

(Supplementary Note 1)

A storefront device comprising:

a first position information acquisition unit configured to acquire first position information indicating positions of approaching people who are nearing merchandise;

a second position information acquisition unit configured to detect second position information indicating a position of a subject person who has stretched an arm out towards the merchandise among the approaching people;

an action detection unit configured to detect a movement action performed on the merchandise; and a person specifying unit configured to specify, based on a positional relationship between the first position information and the second position information, identification information corresponding to the subject person who performed the detected movement action.

(Supplementary Note 2)

The storefront device according to Supplementary Note 1, wherein:

the person specifying unit is configured to acquire the first position information in which facial feature information of the approaching people appear, second position information relating to an axis indicating the arm of the subject person who has stretched an arm out towards the merchandise, and third position information of the merchandise on which the detected movement action was performed;

specify the second position information based on the acquired third position information;

detect the first position information having a significant positional relationship based on the second position information; and specify identification information of a person corresponding to the facial feature information at the position indicated by the detected first position information.

(Supplementary Note 3)

The storefront device according to Supplementary Note 1 or Supplementary Note 2, further comprising:

a sales management unit configured to assign, to management information corresponding to the identification information of the subject person specified by the person specifying unit, the identification information of the merchandise on which, as the movement action, an acquisition action of the merchandise has been performed.

(Supplementary Note 4)

The storefront device according to Supplementary Note 3, wherein:

the sales management unit is configured to delete, from the management information, the identification information of the merchandise on which, as the movement action, a return action of the merchandise has been performed.

(Supplementary Note 5)

The storefront device according to any one of Supplementary Notes 1 to 4, comprising:

an information output unit configured to output, to the subject person, display information regarding the sales management information of the merchandise, based on the identification information of the subject person specified by the person specifying unit, and identification information of the merchandise on which the movement action was performed.

(Supplementary Note 6)

The storefront device according to any one of Supplementary Notes 1 to 5, wherein:

the first position information acquisition unit is configured to acquire the first position information within a three-dimensional space of feature information of the subject person captured by first image capture means.

(Supplementary Note 7)

The storefront device according to any one of Supplementary Notes 1 to 6, wherein:

the action detection unit is configured to detect whether the movement action is a acquisition action or a return action of the merchandise based on a variation in pressure or weight on a placement surface of the merchandise.

(Supplementary Note 8)

The storefront device according to any one of Supplementary Notes 1 to 6, wherein:

the action detection unit is configured to detect whether the movement action is a acquisition action or a return action of the merchandise based on movement information of the merchandise captured by second image capture means.

(Supplementary Note 9)

The storefront device according to any one of Supplementary Notes 1 to 6, wherein:

the action detection unit is configured to detect whether the movement action is a acquisition action or a return action of the merchandise based on presence or absence of the merchandise captured by second image capture means.

(Supplementary Note 10)

A storefront management method comprising:

acquiring first position information indicating positions of approaching people nearing merchandise;

detecting second position information indicating a position of a subject person who has stretched an arm out towards the merchandise among the approaching people;

detecting a movement action performed on the merchandise; and specifying, based on a positional relationship between the first position information and the second position information, identification information corresponding to the subject person who performed the detected movement action.

(Supplementary Note 11)

A program for causing a computer of a storefront device to execute processes, the processes comprising:

acquiring first position information indicating positions of approaching people nearing merchandise;

detecting second position information indicating a position of a subject person who has stretched an arm out towards the merchandise among the approaching people;

detecting a movement action performed on the merchandise; and specifying, based on a positional relationship between the first position information and the second position information, identification information corresponding to the subject person who performed the detected movement action.

INDUSTRIAL APPLICABILITY

According to the present invention, it is possible to improve the merchandise recognition precision of merchandise that has been taken in the hand of a person in a storefront or that has been returned to a merchandise shelf.

REFERENCE SIGNS LIST

1 Storefront device
2 Entrance/exit gate
3 First camera
4 Motion sensor
5 Second camera
6 Merchandise detection sensor
7 Terminal
10 Database
11 Control unit
12 First position information acquisition unit
13 Second position information acquisition unit
14 Action detection unit
15 Person specifying unit
16 Sales management unit
17 Information output unit
20 Storefront
21 Merchandise shelf

The invention claimed is:

1. A storefront device comprising:
at least one memory configured to store instructions; and
at least one processor configured to execute instructions to:
acquire first position information indicating positions of approaching people who are nearing merchandise;
detect second position information indicating a position of a subject person who has stretched an arm out towards the merchandise among the approaching people;
acquire third position information indicating a position of the merchandise when the merchandise is picked up;
specify, based on the first position information and the second position information, identification information of the subject person corresponding to the facial feature information;
specify, based on the second position information and the third position information, the merchandise as being picked up by the subject person; and
generate management information by associating the identification information and the specified merchandise.

2. The storefront device according to claim 1, wherein:
the second position information relates to an axis indicating an arm of the subject person who has stretched the arm out towards the merchandise.

3. The storefront device according to claim 1, wherein the at least one processor is further configured to execute the instructions to:
delete, from the management information, the merchandise returned by the subject person.

4. The storefront device according to claim 1, wherein the at least one processor is further configured to execute the instructions to:
output, to the subject person, display information regarding sales information of the merchandise, based on the management information corresponding to the subject person.

5. The storefront device according to claim 1, wherein the at least one processor is further configured to execute the instructions to:
acquire the first position information within a three-dimensional space of feature information of the subject person captured by a first camera.

6. The storefront device according to claim 1, wherein the at least one processor is further configured to execute the instructions to:
detect whether a movement action indicates that the subject person picked up or returned the merchandise based on movement information of the merchandise captured by a second camera.

7. The storefront device according to claim 1, wherein the at least one processor is further configured to execute the instructions to:
detect whether a movement action is an acquisition action or a return action of the merchandise based on movement information of the merchandise.

8. A storefront management method comprising:
acquiring first position information indicating positions of approaching people nearing merchandise;
detecting second position information indicating a position of a subject person who has stretched an arm out towards the merchandise among the approaching people;
acquiring third position information indicating a position of the merchandise when the merchandise is picked up;

specifying, based on the first position information and the second position information, identification information of the subject person corresponding to the facial feature information;

specifying, based on the second position information and the third position information, the merchandise as being picked up by the subject person; and generating management information by associating the identification information and the specified merchandise.

9. A non-transitory computer-readable recording medium storing a program for causing a computer of a storefront device to execute processes, the processes comprising:

acquiring first position information indicating positions of approaching people nearing merchandise;

detecting second position information indicating a position of a subject person who has stretched an arm out towards the merchandise among the approaching people;

acquiring third position information indicating a position of the merchandise when the merchandise is picked up;

specifying, based on the first position information and the second position information, identification information of the subject person corresponding to the facial feature information;

specifying, based on the second position information and the third position information, the merchandise as being picked up by the subject person; and generating management information by associating the identification information and the specified merchandise.

* * * * *